(12) United States Patent
Lord

(10) Patent No.: US 12,274,255 B2
(45) Date of Patent: Apr. 15, 2025

(54) THERMAL WEEDER

(71) Applicant: EXEL INDUSTRIES, Epernay (FR)

(72) Inventor: David Lord, Birmingham (GB)

(73) Assignee: EXEL INDUSTRIES, Epernay (FR)

( * ) Notice: Subject to any disclaimer, the term of this patent is extended or adjusted under 35 U.S.C. 154(b) by 369 days.

(21) Appl. No.: 17/651,303

(22) Filed: Feb. 16, 2022

(65) Prior Publication Data

US 2022/0264866 A1     Aug. 25, 2022

(30) Foreign Application Priority Data

Feb. 22, 2021   (GB) ...................................... 2102498

(51) Int. Cl.
*A01M 21/04*     (2006.01)
(52) U.S. Cl.
CPC ................................. *A01M 21/04* (2013.01)
(58) Field of Classification Search
CPC .......... A01M 17/002; A01M 2200/011; A01M 21/04
USPC ............................ 43/129, 130, 144; 47/1.44
See application file for complete search history.

(56) References Cited

U.S. PATENT DOCUMENTS

| | | | | |
|---|---|---|---|---|
| 5,031,355 A * | 7/1991 | Ryan | ...................... | A01M 19/00 43/130 |
| 5,319,878 A * | 6/1994 | Moffett | ............... | A01M 1/2094 43/132.1 |
| 6,029,589 A * | 2/2000 | Simpson | ............... | A01M 21/04 111/7.2 |
| 6,190,161 B1 * | 2/2001 | Mandica | ................. | F23Q 3/002 431/258 |
| 6,247,265 B1 * | 6/2001 | Maze | ................... | A01M 17/002 43/124 |
| 7,100,540 B2 * | 9/2006 | Vaughan | ................. | B05B 9/002 122/DIG. 10 |
| 8,529,248 B2 * | 9/2013 | Clement | ............... | F23D 14/465 43/144 |
| 8,627,596 B2 * | 1/2014 | Howerton | ............. | A01M 21/00 134/52 |
| 9,648,864 B1 * | 5/2017 | Kent | ..................... | A01M 21/04 |
| 10,028,499 B2 * | 7/2018 | Ballu | ..................... | A01M 21/04 |

(Continued)

FOREIGN PATENT DOCUMENTS

| | | | | |
|---|---|---|---|---|
| CA | 2515380 C | * | 8/2011 | ............ A01M 15/00 |
| CA | 3083980 A1 | * | 6/2019 | ............ A01G 13/06 |

(Continued)

OTHER PUBLICATIONS

Translation of DE 4039797 A1 (Year: 1991).*

(Continued)

*Primary Examiner* — Morgan T Jordan
(74) *Attorney, Agent, or Firm* — Heslin Rothenberg Farley & Mesiti P.C.; Victor A. Cardona, Esq.

(57) ABSTRACT

A gas powered thermal weeder having a burner head for burning gas to generate heat. The burner head has a foot portion for placing in proximity to weeds to be treated with heat generated at the burner head. The burner head is connected by a support tube to a handle portion, with the handle portion and support tube being for use together in supporting and positioning the burner head during the treatment of weeds. The handle portion comprises a gas canister mounting portion to which a gas canister is mountable for supplying gas to the burner head.

20 Claims, 6 Drawing Sheets

(56) References Cited

U.S. PATENT DOCUMENTS

| | | | |
|---|---|---|---|
| D891,473 S * | 7/2020 | Winterskov | D15/5 |
| 10,750,736 B2 * | 8/2020 | Kent | A01M 21/04 |
| 2005/0143259 A1 * | 6/2005 | Newson | A61L 2/06 |
| | | | 422/27 |
| 2005/0214705 A1 * | 9/2005 | Jaulent | F23D 14/84 |
| | | | 431/186 |
| 2009/0293343 A1 * | 12/2009 | McDonald | A01M 3/007 |
| | | | 43/130 |
| 2010/0024291 A1 * | 2/2010 | Jensen | A01M 21/04 |
| | | | 47/1.44 |
| 2010/0129157 A1 * | 5/2010 | Reddy | A01M 21/04 |
| | | | 422/26 |
| 2017/0215405 A1 * | 8/2017 | Kent | A01M 21/04 |
| 2017/0290325 A1 * | 10/2017 | Han | A01M 21/04 |
| 2019/0281809 A1 * | 9/2019 | Schwenter | A01M 21/04 |
| 2020/0120917 A1 * | 4/2020 | Jackson | A01M 21/04 |
| 2021/0397193 A1 * | 12/2021 | Aramburu | A01D 43/08 |
| 2022/0008889 A1 * | 1/2022 | Jackson | A01M 21/04 |

FOREIGN PATENT DOCUMENTS

| | | | | |
|---|---|---|---|---|
| CN | 206821800 U | * | 1/2018 | |
| CN | 112586482 A | * | 4/2021 | |
| DE | 4039797 A1 | * | 9/1991 | |
| DE | 4445587 A1 | * | 7/1995 | A01M 15/00 |
| DE | 102017222120 A1 | * | 6/2019 | A01M 21/04 |
| EP | 0678240 A1 | * | 10/1995 | |
| EP | 0846414 A1 | | 6/1998 | |
| EP | 0883989 A1 | * | 12/1998 | |
| EP | 0950353 A2 | | 10/1999 | |
| EP | 1540250 B1 | | 9/2011 | |
| EP | 3501276 A1 | | 6/2019 | |
| FR | 2714260 A1 | * | 6/1995 | A01M 15/00 |
| FR | 2743981 A1 | * | 8/1997 | A01M 15/00 |
| FR | 2793415 A1 | | 5/1999 | |
| FR | 2859070 A1 | * | 3/2005 | A01M 15/00 |
| FR | 2906685 A1 | | 9/2006 | |
| GB | 1265081 | | 3/1972 | |
| GB | 2572026 A | | 9/2019 | |
| KR | 20120066412 A | * | 6/2012 | |
| KR | 102095192 B1 | * | 3/2020 | |
| WO | WO-0056143 A1 | * | 9/2000 | A01M 21/043 |

OTHER PUBLICATIONS

Translation of DE 4445587 A1 (Year: 1995).*
Translation of EP 0678240 A1 (Year: 1995).*
Translation of FR 2714260 A1 (Year: 1995).*
Translation of FR 2743981 A1 (Year: 1997).*
Translation of EP_0883989 (Year: 1998).*
Translation of WO 0056143 A1 (Year: 2000).*
Translation of KR 20120066412 A (Year: 2012).*
Translation of CN206821800 (Year: 2018).*
Translation DE_102017222120 (Year: 2019).*
Translation of CA_3083980 (Year: 2019).*
Translation of KR 102095192 B1 (Year: 2020).*
Translation of CN_112586482 (Year: 2021).*
UK Search Report dated Aug. 6, 2021, Application No. GB2102498. 9, 1 pg.

* cited by examiner

THERMAL WEEDER

CROSS REFERENCE TO RELATED APPLICATIONS

This application claims priority from Great Britain Patent Application No. 2102498.9 filed on Feb. 22, 2021, the entire disclosure of which is incorporated herein by reference.

This invention relates to thermal weeders and methods of manufacturing thermal weeders.

There are various types of thermal weeders which are provided for killing say, weeds or grass in way that avoids using chemicals. Some such weeders are electrically driven which can give good results but causes an inconvenience and potential danger by having to be connected to a mains supply of electricity. Other thermal weeders make use of the burning of gas either through the direct application of flames or a hot air flow to an area to be treated or using an infrared technique where a radiant element is heated to a high temperature through burning the gas and from this heat, in the form of infrared radiation, can be directed towards the area to be treated.

Existing thermal weeders, in particular those which are gas powered tend to be unwieldy and difficult for a user to operate. Some are provided in the form of large device which is wheeled along in a similar mode to a domestic lawnmower.

One problem in the design of such devices is how to handle the gas bottle or canister which is needed for supplying gas to the weeder. Existing proposals include the user carrying the gas bottle or canister on a wheeled device in the larger lawnmower style thermal weeders, carrying the gas bottle or canister by hand or in some kind of backpack arrangement or fitting the gas bottle or canister using brackets to some part of the weeder such as a support tube.

In each of these cases an unwieldy design results and connections between the gas bottle or canister and the device proper tend to be made by a gas hose, which can be unsightly and/or cause a risk of damage, entanglement or unwanted disconnection.

Therefore, it would be desirable to provide an alternative form of gas powered thermal weeder which is aimed at addressing at least one of the above issues.

According to one aspect of the present invention there is provided a gas powered thermal weeder comprising a burner head for burning gas to generate heat, the burner head having a foot portion for placing in proximity to weeds to be treated with heat generated at the burner head and the burner head being connected by a support tube to a handle portion, the handle portion and support tube being for use together in supporting and positioning the burner head during the treatment of weeds, wherein the handle portion comprises a gas canister mounting portion to which a gas canister is mountable for supplying gas to the burner head.

This can provide a compact and easy to operate thermal weeder for a user. It helps avoid having an unwieldy device which results if a gas canister is mounted elsewhere on a weeder or is, for example, treated as an object to be carried or handled separately from the weeder itself. It can also help avoid the need to provide an external gas hose connection. Gas flow in use can be through a passage provided in the handle portion.

According to another aspect of the present invention there is provided a gas powered thermal weeder comprising a burner head for burning gas to generate heat, the burner head having a foot portion for placing in proximity to weeds to be treated with heat generated at the burner head and the burner head being connected by a support tube to a handle portion, the handle portion and support tube being for use together in supporting and positioning the burner head during the treatment of weeds.

The handle portion may comprise a gas regulator for regulating gas as it leaves a gas canister mounted on the gas canister mounting portion.

The gas regulator may comprise the gas canister mounting portion.

The gas regulator may be housed in a body portion of the handle portion.

The support tube may comprise an internal channel for feeding gas from the handle portion to the burner head. In such a case gas flow in use can be through a passage in the handle portion and the support tube.

The handle portion may comprise a support connector for connecting an outlet from the gas canister mounting portion to the support tube, the support connector serving to mechanically and fluidically connect the gas canister mounting portion to the support tube. This can be such that in operation gas flows through the support connector and there is mechanical support via the support connector between a carried gas canister and the support tube.

Typically, where there is such an arrangement the support tube comprises said internal channel for feeding gas from the handle portion to the burner head, and in operation gas flows from the support connector into the internal channel.

Where the handle portion comprises a gas regulator the support connector may be connected to an output of the regulator, preferably directly connected to the output of the regulator.

The support connector may comprise a flow carrying portion through which gas flows in operation, and the support connector may further comprise at least one support projection which projects from the flow carrying portion and is held in a body of the handle portion.

This can help in reducing stress on connection(s) between the flow carrying portion on the one hand and the outlet of the gas canister mounting portion and/or the support tube on the other hand. Using a support connector and dispensing with a flexible hose between the gas canister and the inlet into the weeder and ultimately the burner head, helps in producing a compact, easy to handle design, but it has been found that this can bring a problem of increased stress, for example shock loading, on connections in operation. The provision of at least one support projection can alleviate that problem.

The flow carrying portion may be an elbow portion.

The at least one support portion may comprise an arm portion that projects away from the flow carrying portion in a direction away from the gas canister mounting portion. In some embodiments this may lead to the support connector having a generally overall T-shape. In such a case a leg of the T may engage with the support tube, a first arm may be connected to the outlet of the gas canister mounting portion and a second arm may extend away from the leg in a direction opposite to the gas canister mounting portion.

The support tube may be of metal. The support connector may be of metal.

The thermal weeder may comprise an ignition system comprising a piezo-electrically driven actuator provided in the handle portion and connected via an ignition cable to a spark unit at the burner head.

The support tube may comprise an ignition cable channel for housing the ignition cable between the handle portion and the burner head. The ignition cable channel may comprise a second internal channel, which may run alongside the internal channel for feeding gas from the handle portion to the burner head. That is to say the support tube may comprise a pair of internal channels that run side by side, one for carrying gas to the burner head and one for carrying the ignition cable to the burner head.

The thermal weeder may comprise an air intake for drawing air in to mix with gas as the gas flows into the burner head during operation.

The air intake may comprise at least one aperture provided in a side wall of a gas mixing passage and may comprise a surrounding shroud to shield the aperture. The shroud may be cup shaped with a base provided around the gas mixing passage and a rim which is spaced from the side wall of the gas mixing passage.

The air intake may further comprise an apertured cap portion which fits on the cup shaped shroud and covers the space between the rim and the side wall of the gas mixing passage. This can help prevent foreign objects collecting in the shroud or more generally fouling the air intake whilst still permitting the intake of air.

The weeder may comprise an injector unit for injecting gas into the gas mixing passage and drawing air into the gas mixing passage.

In some embodiments the gas mixing passage may be located in the support tube and the side wall of the gas mixing passage may comprise the side wall of the support tube.

In a preferred embodiment the burner head comprises an air tube which defines the gas mixing passage. In such a case the injector unit may be provided at the end of the support tube. The injector unit may join the support tube to the air tube and hence the burner head.

In alternative the support tube may comprise two portions, a first leading from the handle portion to the region of the air intake and a second leading from the air intake to the burner head.

In such a case the injector unit may be provided at an end of the first portion of the support tube and the gas mixing passage may be provided in the second support tube portion. The injector unit may join the first support tube portion to the second support tube portion.

The burner head may have a body portion to which the support tube is mounted. This mounting may be via the air tube when present. The foot portion may be provided on a side of the body portion which is opposite to where the support tube is mounted.

The body portion may define a gas mixing chamber where air and fuel can mix in operation.

The burner head may define a combustion zone where gas is burned in operation to generate heat.

The combustion zone may be defined in part by the body portion. The combustion zone may be defined in part by the foot. The combustion zone may be bounded on each side by a respective wall portion to avoid foreign objects entering the combustion zone. One side of the combustion zone may be defined by a screen (acting as one of the respective wall portions) to allow the escape of gases and heat.

The thermal weeder may be an infrared thermal weeder which is arranged to output infrared radiation for treating an area.

A radiant element, such as a ceramic block, may be provided in the combustion zone. In such a case as gas is burned in the burner head in operation, the radiant element will heat up and serve to emit infrared radiation which can be used to treat an area of interest. At the same time the radiant element can contained in the combustion zone with each side bounded by a respective wall portion to avoid foreign objects entering the combustion zone, and correspondingly avoiding there being an uncovered naked flame.

The radiant element may be apertured so that in use the air-fuel mix can flow through the element and burn in and/or around the element. This can give a more controlled burn. Typically the air-fuel mix will tend to burn at a lower surface of the radiant element in use, that is at a surface which is closest to the exterior of the combustion zone. Typically this will be in the region of the screen where present.

The foot portion may be provided with at least one wheel for facilitating movement of the foot portion over ground to be treated.

The foot portion may be provided with at least one skid portion for facilitating movement of the foot portion over ground to be treated.

The foot portion may be provided with at least one wheel towards one end and provided with at least one skid portion towards a second end which is opposite to the first end.

The foot portion may have an intended direction for forward movement and be provided with at least one wheel towards a rear end and provided with at least one skid towards a front end.

The foot portion may have a bottom surface for placing on the ground and the support tube may be mounted to the burner head at an angle which is inclined away from a perpendicular to the bottom surface. In practice this typically means that with the foot portion rested on the ground the support tube "leans backwards".

In such a case a front end of the foot portion is at an end away from which the support tube is inclined, and a rear end of the foot portion is at an end towards which the support tube is inclined.

The foot portion may comprise a screen that covers an open face of the combustion zone such that heat, in particular infrared radiation, may escape the combustion zone. At the same time this arrangement can avoid the thermal weeder having and open, unguarded, naked flame in use.

Typically the screen also allows the escape of gas—that is any unburnt fuel gas, air, and exhaust gas.

The screen may comprise a sheet of mesh. The screen may be of metal.

The spark unit may be disposed in the combustion zone and may be disposed in the region of the screen.

The foot portion may comprise a skirt portion for defining an area to be treated. The skirt portion can shield against heat dissipating away and so concentrate heating in the desired area. Further the skirt may assist in avoiding the flame being blown out in operation.

The skirt portion may be provided around a periphery of the foot portion. The skirt portion may be disposed so as to run around but be spaced from a periphery of the screen.

A wind deflector portion may be provided on an underside of the foot within an area bounded by the skirt on one edge and bounded by the screen on the other edge. This can help deflect wind that may enter the area bounded by the skirt away from entering the screen. This in turn can help reduce the chance of the flame in the combustion zone being blown out in operation.

The wind deflector portion may be provided around the periphery of the screen. The wind deflector portion may run continuously around the periphery of the screen.

The screen may be spaced from the exposed face of the radiant element and the wind deflector portion may extend at least part way across this spacing. The wind deflector portion may act as a wall portion which defines a respective part of the boundary of combustion zone.

The skirt may depend from a top wall of the foot. The wind deflector portion may depend from the underside of the top wall of the foot. The screen may be spaced way from the top wall of the foot.

The gas mixing chamber may have an inlet leading, say from the gas mixing passage, into the gas mixing chamber.

At least one baffle member may be provided in the gas mixing chamber at a location between the inlet into the gas mixing chamber and the radiant element. Such a baffle element may serve to guide gas flow in the gas mixing chamber to help prevent early release of unburnt fuel and to help improve mixing of air and fuel in the gas mixing chamber. This in turn can serve to equalise, or at least spread out a heating effect at the radiant element.

In one set of embodiments the radiant element may be dimensioned and arranged to promote even heating over its extent. Where the radiant element is apertured, the size and/or number of the apertures may be varied over the extent of the radiant element. This can help promote even heating. For example in a first area there may be more and/or larger apertures than in a second area.

In such a case the second area may be one identified to have greater gas flow.

According to a further aspect of the invention there is provided a method of manufacturing a thermal weeder as defined above comprising a baffle and a radiant element provided in a combustion zone defined within the burner head, the method comprising the steps of selecting the size, shape and position of the baffle and the size, shape and position of the radiant element to optimise even heating across the extent of the radiant element in operation.

The handle portion may comprise two user grip portions, a first arranged to be held by a first hand and a second to be held by a second hand in use.

The first grip portion may be provided at a first location which may be beyond the end of the support tube. The second grip portion may be provided at a second location which is spaced from the first location, and spaced from the support tube in a direction which is away from the gas canister mounting portion.

This can provide a balanced holding arrangement where the weeder is primarily held via the second grip portion and stabilised, if necessary, by use of the first grip portion.

The weeder may be arranged so that when the weeder is held by the second grip portion in an operative orientation, a centre of gravity of the weeder, when carrying a gas canister, is located on a vertical line which intersects with the second grip portion.

The handle portion may comprise a regulator control knob which is provided at a location on the handle portion which is on an opposite side of the support tube than the second grip portion.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

Embodiments of the present invention will now be described, by way of example only, with reference to the accompanying drawings in which:

FIG. 1 schematically shows a gas powered thermal weeder carrying a gas canister;

Figure 1:
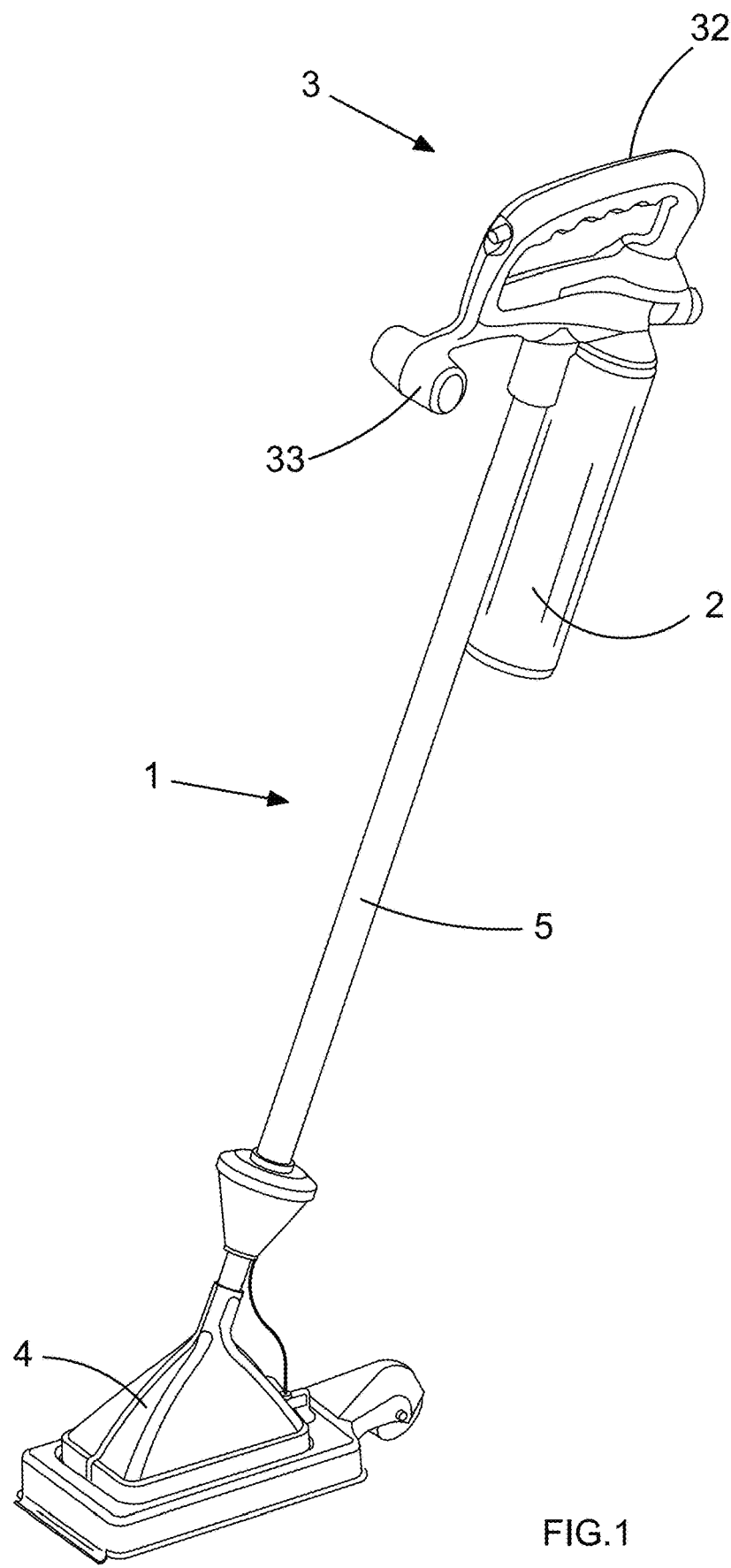

FIG. 1 schematically shows a handheld gas powered infrared thermal weeder 1 with a gas canister 2 mounted thereon. The thermal weeder comprises a handle portion 3 to which the gas canister 2 is mounted and a burner head 4 which is connected to the handle portion 3 via a support tube 5. The support tube 5 serves to mechanically and fluidically connect the handle portion 3, and ultimately the carried gas canister 2 to the burner head 4. The support tube 5 typically will be of metal and may be a metal extrusion say of aluminium.

In general operation gas is fed from the gas canister 2 via the support tube 5 to the burner head 4 where the gas is burnt for generating heat for treating an area to be treated by the burner head 4. In use the burner head 4 is moved and positioned by a user holding the handle portion 3 so that together the handle portion 3 and support tube 5 serve to support and position the burner head 4 in operation. in use gas flows in passages within the handle portion 3 and within the support tube 5 rather than via an external gas hose.

Figure 2:
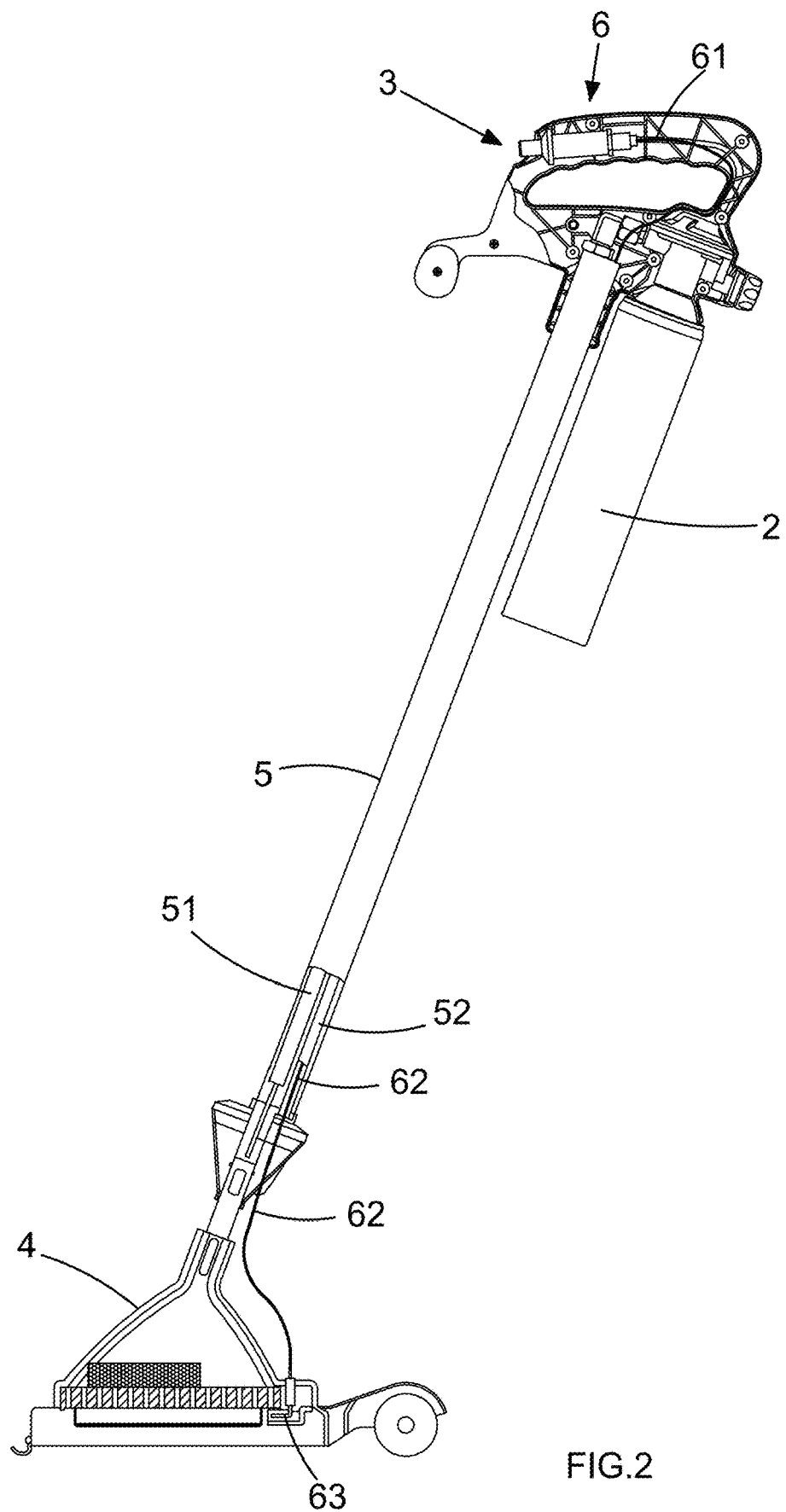
FIG. 2 is schematic sectional view of the gas powered thermal weeder and gas canister of FIG. 1.

FIG. 2 shows a schematic sectional view of the thermal weeder 1. Here can be seen an internal channel 51 of the support tube 5 which is used for carrying gas from the handle portion 3 and ultimately from a carried gas canister 2 to the burner head 4.

The thermal weeder 1 includes an ignition system 6 having a piezo-electric actuator 61 situated in the handle portion 3 which is connected via a cable 62 to a spark unit 63 provided at the burner head 4. The cable 62 runs in second internal channel 52 which in this embodiment is provided side by side with the gas channel 51 in the support tube 5. The ignition system also includes a grounding cable connected between the actuator 61 and a convenient metallic part in the handle portion 3.

This arrangement means that first there no external gas hose connection between the gas canister 2 and the burner head 4 in the present embodiment and further the ignition cable 62 is largely housed within the support tube 5.

Figure 3:
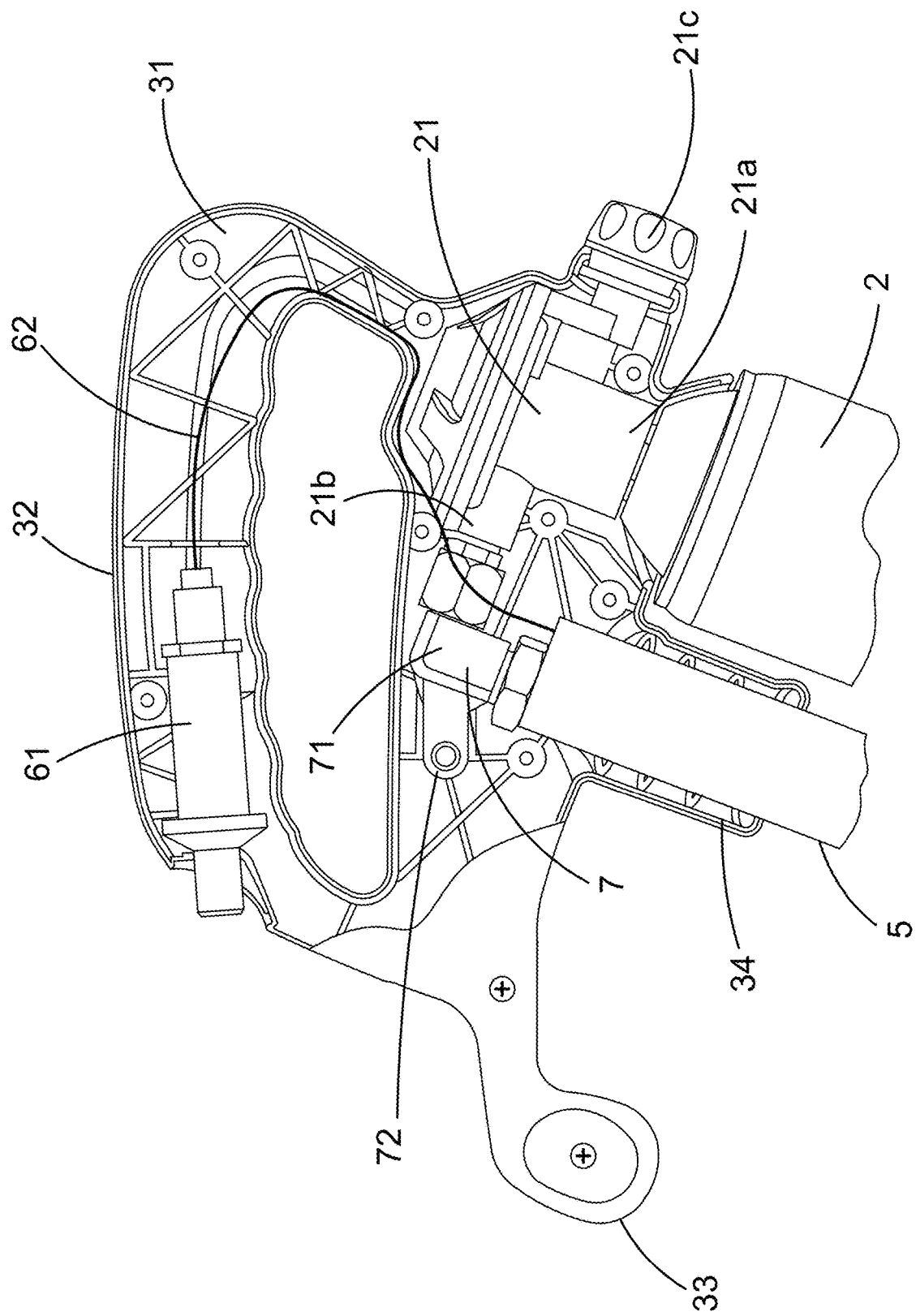
FIG. 3 is a schematic sectional view showing a handle portion of the gas powered thermal weeder of FIGS. 1 and 2 as well as part of a support tube and a carried gas canister.

FIG. 3 shows parts of the handle portion 3 in more detail.

The handle portion 3 comprises a body portion 31 which provides a first user grip portion 32 and a second user grip portion 33 (see FIGS. 1 and 3). The body portion 31 also houses other components.

The first user grip portion 32 is provided beyond the end of the support tube 5 and can act as one handle for holding the thermal weeder 1 in use. The second user grip portion 33 is spaced away from the first user grip portion 32 and spaced away from the support tube 5. The second user grip portion 33 is useful for holding the device and the first user grip portion 32 is useful for supporting and stabilising the burner head 4 and the thermal weeder 1 overall during operation. The thermal weeder 1 is arranged so that overall with the thermal weeder in an intended operating orientation such as shown in FIG. 2, the centre of gravity of the device overall including a fitted gas canister 2 is located at a location which is "under" the second user grip portion 33. That is to say a vertical drawn through the centre of gravity will intersect with the second user grip portion 33. This means that the user may hold the second user grip portion 33 at what might be termed a balance position for operation of the weeder.

The piezo-electric actuator 61 and an initial part of the length of the cable 62 are housed within the body portion 31 of the handle portion 3.

The body portion 31 further houses and supports a gas regulator 21 to which the gas canister 2 is mounted in use. The gas regulator 21 correspondingly comprises a gas canister mounting portion 21a. The gas regulator 21 further comprises an outlet portion 21b and a control knob 21c for controlling the rate at which gas is allowed to flow through the regulator from the gas canister 2 and out of the outlet portion 21b.

The body portion 31 of the handle portion 3 further houses a support connector 7. The support connector 7 has a flow carrying portion 71 which in this embodiment is in the form an elbow portion. The flow carrying portion 71 is connected to the outlet portion 21b of the regular 21 on the one hand and to an end of the support tube 5 (in particular to an end of the internal gas carrying channel 51 of the support tube 5) on the other hand. Thus, the support connector 7 serves to fluidically and mechanically connect the regulator 21 to the support tube 5. In this embodiment the flow carrying portion 71 is directly connected to the outlet portion 21b of the regulator 21 and directly connected to the support tube 5. This is preferred (as it is simple, compact and effective) but in other cases intermediate parts might be provided and similar advantages obtained, provided there is supporting mechanical connection between the regulator 21 and the support tube 5. It will be noted that the connection between the regulator 21 and the support tube 5 is within the body of the handle portion 31 and also that the gas canister mounting portion 21a is within the body of handle portion 31.

The support connector 7 serves to mechanically connect the regulator 21 to the support tube 5. In use this means that when the gas canister 2 is mounted to the mounting portion 21a of the regulator 21 there is mechanical connection between the gas canister 2 and the support tube 5 via the regulator 21 and the support connector 7. This arrangement provides support for the gas canister 2 when carried and also avoids the inclusion of any gas hose connection.

However, this may tend to increase stress on the connections between the gas regulator 21 and support tube 5. That is to say in particular, between the outlet of the regulator 21b and the flow carrying portion 71 on the one hand and between the flow carrying portion 71 and the end of the support tube 5 on the other hand.

To help minimise these stresses and share the load, the support connector 71 also comprises a support portion 72 which projects away from the flow carrying portion 71. In this embodiment, this support portion 72 is an arm which projects in a direction away from the gas regulator 21. This arm portion 72 is captured and held in the body portion 31 of the handle portion 3 to help reduce the stress on the above mentioned connections. The body of the handle portion 31 also comprises a tube holding sleeve portion 34 into which the support tube 5 is inserted and via which it is supported. The support connector 7 in this embodiment has a generally T-shape with a leg of the T connected to the support tube 5. The grounding cable may for example, be connected to the support portion 72.

Note that in at least some cases the weeder may be arranged to allow the connection of a lager gas canister (more commonly termed a gas bottle in those instances) to the weeder via an adaptor (not shown) and a length of hose. Thus the weeder 1 can be used with a gas canister 2 mounted on the gas canister mounting portion 21a for optimum convenience and manoeuvrability as shown in the drawings or can be used with a larger gas canister or bottle connected via a hose and an adaptor to the gas canister mounting portion to give longer operation times. This option can be provided in cases where the handle portion 31 houses a regulator 21 as in the present embodiment and in cases where there is no on-board regulator 21 such that the gas canister mounting portion 21a is provided on another component. In general terms an adaptor (not shown) may be provided for allowing connection of a gas canister or bottle to the gas canister mounting portion 21a via a length of hose.

Figure 4:
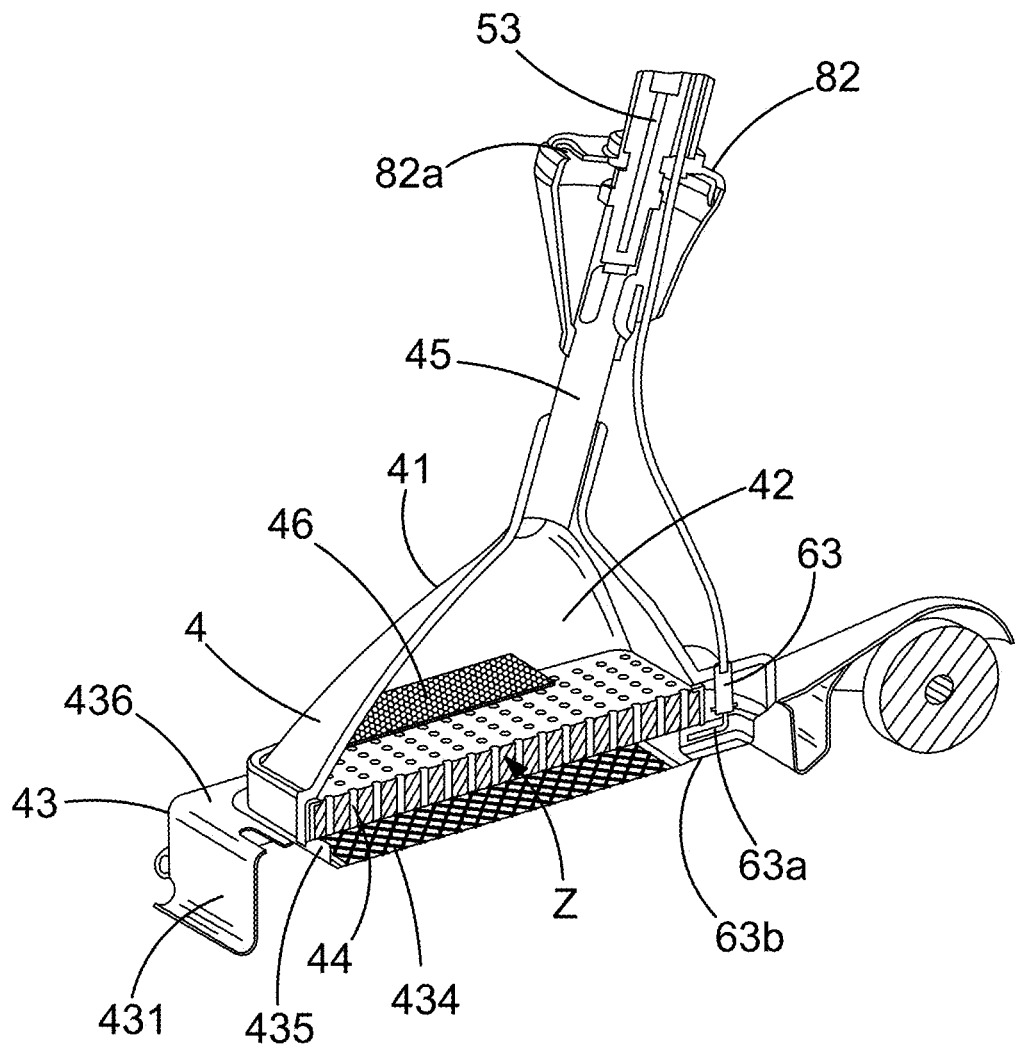
FIG. 4 is a schematic sectional view of a burner head of the gas powered thermal weeder shown in FIGS. 1 to 3.
Figure 5:
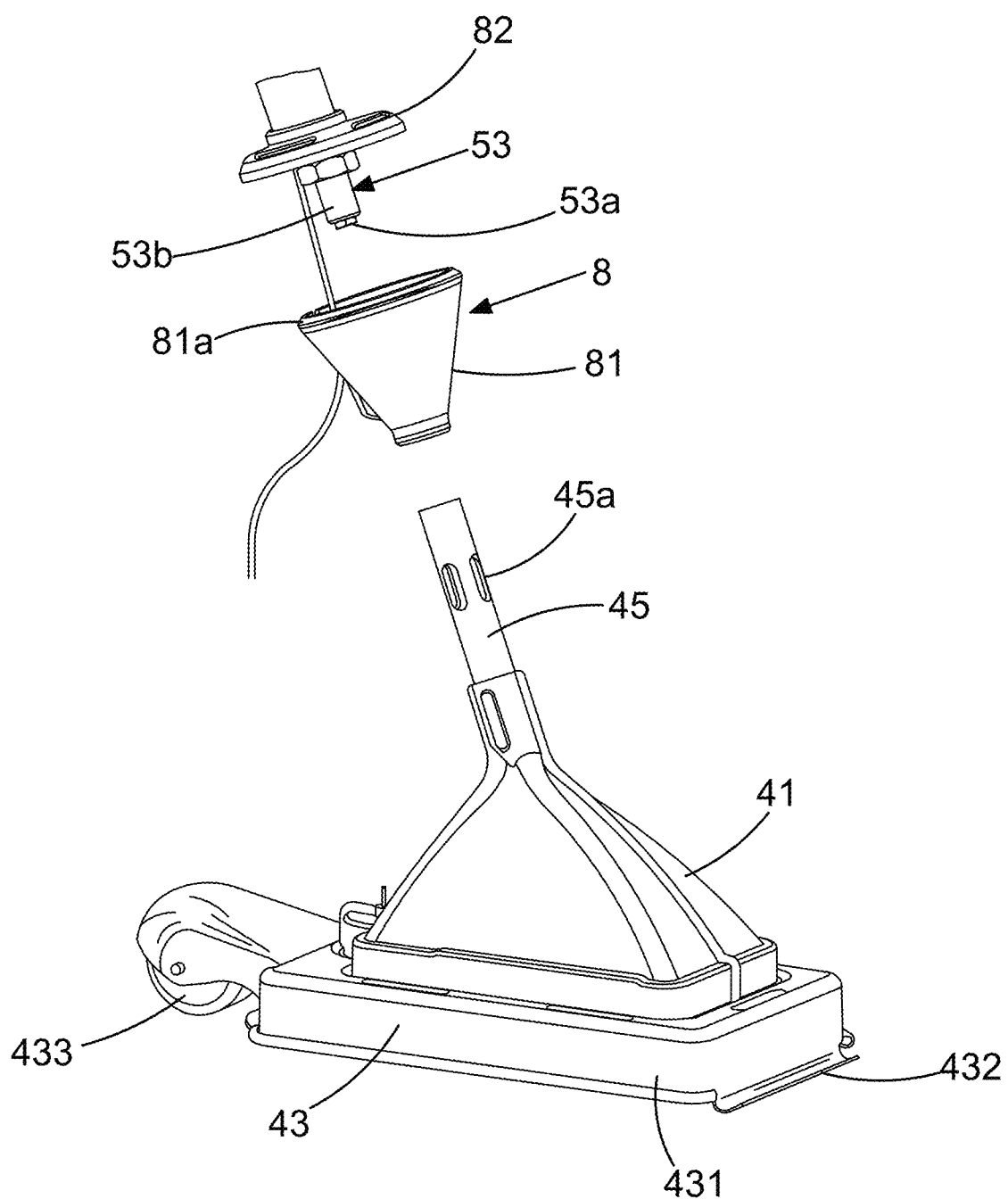
FIG. 5 is a schematic view of the burner head of FIG. 5 with the support tube and an air intake arrangement disassembled from the burner head.
Figure 6:
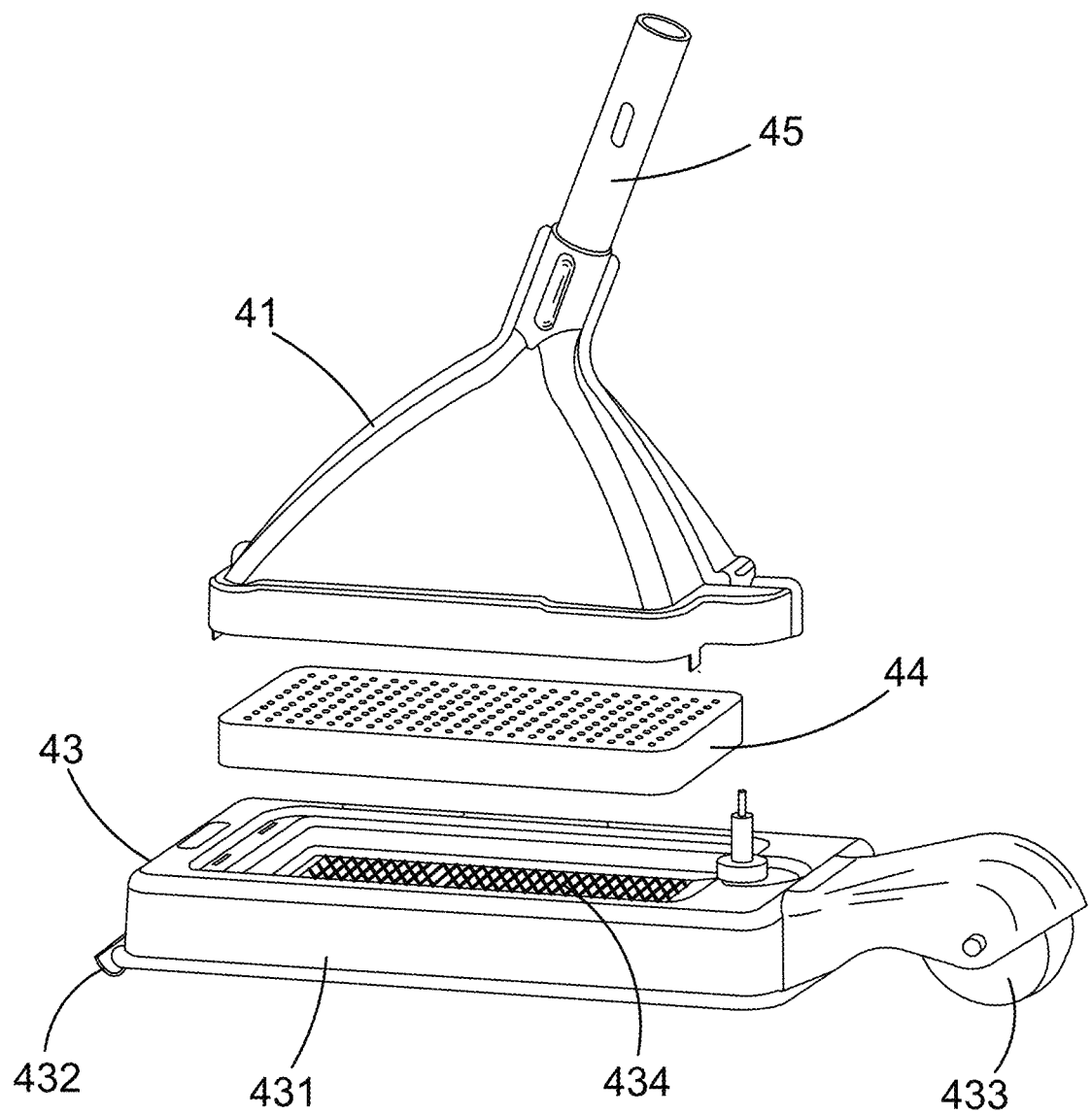
FIG. 6 is an exploded schematic view of the burner head shown in FIGS. 4 and 5.

FIGS. 4, 5 and 6 show the burner head 4 in more detail. The burner head 4 comprises a body portion 41 which defines a gas mixing chamber 42 in which the gas is mixed with air in use and a foot portion 43 which is arranged to be positioned on the ground in use when treating an area. Together the foot portion 43 and body portion define a combustion zone Z in which the gas or, more accurately, the air-fuel mix is burnt in use. The foot portion 43 has a surrounding skirt 431 which serves to define an area for treatment. That is to say the skirt 431 will tend to contain the heat within the area which it bounds.

A skid portion 432 is provided at the front of the foot portion 43 with the skid portion 432 depending from the skirt 431 and a wheel is provided 433 at the rear of the foot portion 43. The wheel 433 and skid 432 can help a user in manoeuvring the device during treatment. In practical operation, in some instances, a user will choose to pick the thermal weeder 1 up away from the surface to be treated, move it to the desired location, and then place it down in contact with the surface for treatment. In other instances it may be convenient to push the weeder 1 along between treatment areas with the weeder 1 running on the wheel 433 and optionally the skid 432.

Housed within the combustion zone Z at a lower portion of the gas mixing chamber 42 is a radiant element in the form of an apertured ceramic block 44. The burner head 4 comprises an air tube 45 which leads into the body portion 41 and provides an inlet into the gas mixing chamber 42. A baffle 46 is provided in the gas mixing chamber 42 and located between the inlet formed by the air tube 45 and the ceramic block 44.

As seen by considering FIGS. 4 and 5, the end of the support tube 5 nearest the burner head 4 is provided with an injector unit 53. The injector unit 53 comprises an injector element 53a and a coupling tube 53b. The injector unit 53, in particular the coupling tube 53b serves to join the support tube 5 to the air tube 45 of the burner head 4. The injector element 53a serves to inject gas into the interior of the air tube 45 which acts as a gas mixing passage. Apertures 45a are provided in the side walls of the air tube 45 to act as an air intake. Thus, as gas is supplied from the gas canister it travels through the tube 5 and exits the injector element 53b. Here, air is drawn through the apertures 45a into the air tube 45 where the air and gas can mix before entering into the gas mixing chamber 42.

The baffle 46 serves to control the flow of the air fuel mix through the gas mixing chamber 42 to help ensure mixing and deliver this mix evenly to the ceramic block 44 where it is burnt. The ceramic block 44 is provided with a large number of apertures therethrough such that the gas can be burnt in and around the ceramic block 44 in operation so heating up the ceramic block 44 and causing it to act as a radiant member to allow thermal treatment via emission of infrared radiation. The air-fuel mix tends to burn at the, exposed, lower surface of the ceramic block 44.

A shroud 8 is provided around the air inlet provided by the apertures 45a. This shroud 8 comprises a conical portion 81 which is provided around the air tube 45 in the region of the apertures 45a and a cap portion 82 which includes apertures 82a. The conical portion 81 serves to shield the apertures 45a in the air tube 4 against eg the effects of wind. The apertured cap 82 allows to air to enter into the conical portion 81 such that it can be drawn in through the apertures 45a in the air tube 45. At the same time the cap 82 covers the space between a rim 81a of the conical portion 81 and the outside wall of the air tube 45 to minimise the risk of foreign objects such as leaves and earth entering the conical portion 81 and potentially fouling the air inlets 45a.

The foot portion 43 includes an expanded mesh screen 434 which is provided within the bounds of the skirt portion 431 and provides a lower boundary to the combustion zone Z. This mesh screen 434 serves to allow heat and exhaust gas to escape the combustion chamber 42 whilst avoiding flames at the ceramic block 44 in use being exposed to the surroundings. The screen 434 can also serve to prevent foreign objects from entering into the combustion zone Z and potentially damaging or fouling the ceramic block 44.

The screen 434 is supported at a distance away from the ceramic block 44 by (in this embodiment) an extended spacer profile 435, which acts as a wind deflector portion. The spacer profile 435 is provided around the periphery of the screen 434 and extends across (one might say covers) the spacing between the screen 434 and the ceramic block 44. The spacer profile 435 depends from a top wall 436 of the foot portion 43 from which the skirt portion 431 also depends. The spacer profile 435 thus also extends across the spacing between an underside of the top wall 436 and the screen 434. The spacer profile 435 in this embodiment provides a part of the boundary of the combustion zone Z.

The spacer profile 435 serves to deflect wind that may enter the area bounded by the skirt 431 and allows at least part of the flame on the surface of the ceramic block 44 to be hidden and so not be blown out so easily. If a small portion of the flame remains alight this can then reignite the fuel air mix over the remainder of the ceramic block 44 when the wind/draft subsides.

As best seen in FIG. 4 the spark unit 63 of the ignition system includes an electrode 63a which is located behind a shielding portion 63b to protect it from external damage. The electrode 63a is located in the region of metallic parts in the foot portion 43, say the shielding portion 63b, such that a spark can be generated between the electrode 63a and those surrounding metallic parts on operation of the actuator 61. Thus in use to light the thermal weeder, a user turns the regulator knob 21c to an on position and operates the actuator 61 to cause a spark to light the air fuel mix in the combustion zone Z.

The invention claimed is:

1. A gas powered infrared thermal weeder comprising:
a burner head for burning gas to generate heat, the burner head having a foot portion for placing in proximity to weeds to be treated with heat generated at the burner head,
the burner head being connected by a support tube to a handle portion, the handle portion and the support tube being for use together in supporting and positioning the burner head during the treatment of weeds, wherein the handle portion comprises a gas canister mounting portion to which a gas canister is mountable for supplying gas to the burner head,
the burner head defining a combustion zone where gas is burned in operation to generate heat,
an apertured ceramic block forming a radiant element in the combustion zone,
the foot portion comprising a screen bounding one side of the combustion zone, the screen spaced from an exposed face of the apertured ceramic block by a first spacing,
the foot portion comprising a skirt portion provided around, but spaced from, a periphery of the screen and depending from a top wall of the foot to form a recessed region in an underside of the foot for defining an area to be treated, and
a wind deflector portion on an underside of the foot portion within an area bounded by the skirt on one edge and bounded by the screen on the other edge, the wind deflector portion running around a periphery of the screen and extending at least part way across said first spacing.

2. The gas powered infrared thermal weeder according to claim 1 in which the handle portion comprises a gas regulator for regulating gas as it leaves a gas canister mounted on the gas canister mounting portion.

3. The gas powered infrared thermal weeder according to claim 1 in which the support tube comprises an internal channel for feeding gas from the handle portion to the burner head.

4. The gas powered infrared thermal weeder according to claim 1 in which the handle portion comprises a support connector for connecting an outlet from the gas canister mounting portion to the support tube, the support connector serving to mechanically and fluidically connect the gas canister mounting portion to the support tube, so that in operation gas flows through the support connector and there is mechanical support via the support connector between a carried gas canister and the support tube.

5. The gas powered infrared thermal weeder according to claim 4 in which the support connector comprises a flow carrying portion through which gas flows in operation, and the support connector further comprises at least one support projection which projects from the flow carrying portion and is held in a body of the handle portion.

6. The gas powered infrared thermal weeder according to claim 5 in which the at least one support portion comprises an arm portion that projects away from the flow carrying portion in a direction away from the gas canister mounting portion.

7. The gas powered infrared thermal weeder according to claim 1 in which the thermal weeder comprises an ignition system comprising a piezo-electrically driven actuator provided in the handle portion and connected via an ignition cable to a spark unit at the burner head.

8. The gas powered infrared thermal weeder according to claim 7 in which the support tube comprises an ignition cable channel for housing the ignition cable between the handle portion and the burner head.

9. The gas powered infrared thermal weeder according to claim 1 in which the thermal weeder comprises an air intake for drawing air in to mix with gas as the gas flows into the burner head during operation, wherein the air intake comprises at least one aperture provided in a side wall of a gas mixing passage and a surrounding shroud to shield the aperture, the shroud being cup shaped with a base provided around the gas mixing passage and a rim which is spaced from the side wall of the gas mixing passage and the air intake further comprising an apertured cap portion which fits on the cup shaped shroud and covers the space between the rim and the side wall of the gas mixing passage.

10. The gas powered infrared thermal weeder according to claim 1 in which the burner head has an inlet for allowing an air fuel mix into a gas mixing chamber and at least one baffle member is provided in the gas mixing chamber at a location between the inlet into the burner head and the radiant element.

11. The gas powered infrared thermal weeder according to claim 1 in which the foot portion is provided with at least one wheel for facilitating movement of the foot portion over ground to be treated.

12. The gas powered infrared thermal weeder according to claim 11 in which the foot portion is provided with said at least one wheel towards a first end and provided with at least one skid portion towards a second end which is opposite to the first end.

13. The gas powered infrared thermal weeder according to claim 1 in which the handle portion comprises two user grip portions, a first grip portion of the grip portions arranged to be held by a first hand and a second grip portion of the grip portions arranged to be held by a second hand in use, wherein the first grip portion is provided at a first location and the second grip portion is provided at a second location which is spaced from the first location, and spaced from the support tube in a direction which is away from the gas canister mounting portion.

14. The gas powered infrared thermal weeder according to claim 6 wherein the handle portion comprises a body portion which provides the first and the second user grip portions, the body portion further housing at least one of the gas regulator, the support connector and the piezoelectric actuator.

15. The gas powered infrared thermal weeder according to claim 1 wherein at least one baffle member is provided in the gas mixing chamber at a location between the inlet to the burner head and the radiant element.

16. The gas powered infrared thermal weeder according to claim 1 wherein the support tube defines a flow path for feeding gas from the gas canister mounting portion to the burner head, and the handle portion comprises a support connector for mechanically and fluidically connecting an outlet from gas canister mounting portion to the support tube, the support connector comprising at least one support projection which projects from a flow carrying portion of the support connector such that the support connector is generally T-shaped.

17. The gas powered infrared thermal weeder according to claim 16 wherein a leg of the T-shaped support connector engages with the support tube, a first arm of the T-shaped support connector is connected to the outlet of the gas canister mounting portion and a second arm of the T-shaped support connector extends away from the leg in a direction opposite to the gas canister mounting portion.

18. The gas powered infrared thermal weeder according to claim 17 wherein the second arm comprises the support projection.

19. A gas powered infrared thermal weeder comprising:
a burner head for burning gas to generate heat, the burner head having a foot portion for placing in proximity to weeds to be treated with heat generated at the burner head,
the burner head being connected by a support tube to a handle portion, the handle portion and the support tube being for use together in supporting and positioning the burner head during the treatment of weeds,
the handle portion comprising a gas canister mounting portion to which a gas canister is mountable for supplying gas to the burner head,
the handle portion comprising a support connector for connecting an outlet from the gas canister mounting portion to the support tube, the support connector serving to mechanically and fluidically connect the gas canister mounting portion to the support tube,
the support connector comprising a flow carrying portion through which gas flows in operation, and the support connector further comprises at least one support projection which projects from the flow carrying portion and is held in a body of the handle portion,
the burner head defining a combustion zone where gas is burned in operation to generate heat,
an apertured ceramic block forming a radiant element in the combustion zone,
the foot portion comprising a screen bounding one side of the combustion zone, which screen is spaced from an exposed face of the apertured ceramic block by a first spacing,
the foot portion comprising a skirt portion provided around, but spaced from, a periphery of the screen and depending from a top wall of the foot to form a recessed region in an underside of the foot for defining an area to be treated, and
a wind deflector portion on an underside of the foot portion within an area bounded by the skirt on one edge and bounded by the screen on the other edge, the wind deflector portion running around a periphery of the screen and extending at least part way across said first spacing.

20. A gas powered infrared thermal weeder comprising:
a burner head for burning gas to generate heat, the burner head having a foot portion for placing in proximity to weeds to be treated with heat generated at the burner head and the burner head being connected by a support tube to a handle portion, the handle portion and the support tube being for use together in supporting and positioning the burner head during the treatment of weeds,
the handle portion comprising a gas canister mounting portion to which a gas canister is mountable for supplying gas to the burner head and the support tube defines a flow path for feeding gas from the gas canister mounting portion to the burner head,
the handle portion comprising a support connector for mechanically and fluidically connecting an outlet from gas canister mounting portion to the support tube, the support connector comprising at least one support projection which projects from a flow carrying portion of the support connector such that the support connector is generally T-shaped,
a leg of the T-shaped support connector engaging with the support tube,
a first arm of the T-shaped support connector connected to the outlet of the gas canister mounting portion and a second arm of the T-shaped support connector extends away from the leg in a direction opposite to the gas canister mounting portion and the second arm comprises the support projection,
the burner head defining a combustion zone where gas is burned in operation to generate heat,
an apertured ceramic block forming a radiant element in the combustion zone,
the foot portion comprising a screen bounding one side of the combustion zone, the screen spaced from an exposed face of the apertured ceramic block by a first spacing, the foot portion comprising a skirt portion around, but spaced from, a periphery of the screen and depending from a top wall of the foot to form a recessed region in an underside of the foot for defining an area to be treated, and a wind deflector portion on an underside of the foot portion within an area bounded by the skirt on one edge and bounded by the screen on the other edge, the wind deflector portion running around a periphery of the screen and extending at least part way across said first spacing.

* * * * *

UNITED STATES PATENT AND TRADEMARK OFFICE
CERTIFICATE OF CORRECTION

| | | |
|---|---|---|
| PATENT NO. | : 12,274,255 B2 | Page 1 of 1 |
| APPLICATION NO. | : 17/651303 | |
| DATED | : April 15, 2025 | |
| INVENTOR(S) | : David Lord | |

It is certified that error appears in the above-identified patent and that said Letters Patent is hereby corrected as shown below:

In the Claims

Column 11, Line 27: Claim 14, Delete "claim 6" and insert -- claim 13 --

Signed and Sealed this
Twenty-seventh Day of May, 2025

Coke Morgan Stewart
*Acting Director of the United States Patent and Trademark Office*